(12) United States Patent
Nagai et al.

(10) Patent No.: US 12,476,311 B2
(45) Date of Patent: Nov. 18, 2025

(54) POWER STORAGE DEVICE CONTAINED BY EXPANSION RESTRAINT MODULE

(71) Applicants: TOYOTA JIDOSHA KABUSHIKI KAISHA, Toyota (JP); Prime Planet Energy & Solutions, Inc., Tokyo (JP)

(72) Inventors: Hiroki Nagai, Ama-gun (JP); Takaaki Matsui, Toyota (JP); Takafumi Nose, Nagoya (JP); Koichiro Isobe, Toyota (JP); Ryoichi Wakimoto, Kobe (JP)

(73) Assignees: TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 734 days.

(21) Appl. No.: 17/674,999

(22) Filed: Feb. 18, 2022

(65) Prior Publication Data
US 2022/0278401 A1  Sep. 1, 2022

(30) Foreign Application Priority Data
Feb. 26, 2021  (JP) .................................. 2021-029770

(51) Int. Cl.
| | |
|---|---|
| *H01M 50/186* | (2021.01) |
| *H01M 10/0525* | (2010.01) |
| *H01M 50/184* | (2021.01) |
| *H01M 50/209* | (2021.01) |
| *H01M 50/249* | (2021.01) |

(Continued)

(52) U.S. Cl.
CPC ..... *H01M 50/186* (2021.01); *H01M 10/0525* (2013.01); *H01M 50/184* (2021.01); *H01M 50/209* (2021.01); *H01M 50/249* (2021.01); *H01M 50/264* (2021.01); *H01M 50/289* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,777,784 B2 * | 9/2020 | Schneider | ........... H01M 50/103 |
| 2018/0138487 A1 | 5/2018 | Kamiya et al. | |

(Continued)

FOREIGN PATENT DOCUMENTS

| | | |
|---|---|---|
| CN | 108075097 A | 5/2018 |
| JP | 2012-113961 A | 6/2012 |

(Continued)

*Primary Examiner* — Jeffrey T Barton
*Assistant Examiner* — Karen J. Armstrong
(74) *Attorney, Agent, or Firm* — Oliff PLC

(57) ABSTRACT

A power storage device includes a plurality of power storage cells. An end surface portion of a case has an aspect ratio of 1.4 or more. At least a part of a first region between a lower end of a sealing part projected image and an upper end of a principal surface region projected image receives a pressure of a first surface pressure. At least a part of a second region between the upper end of the principal surface region projected image and a lower end of the principal surface region projected image receives a pressure of a second surface pressure. The first surface pressure is higher than the second surface pressure and is 1.5 MPa or more and 3.5 MPa or less. A height of at least a part of the first region receiving the pressure of the first surface pressure is 1 mm or more.

6 Claims, 15 Drawing Sheets

(51) Int. Cl.
*H01M 50/264* (2021.01)
*H01M 50/289* (2021.01)

(56) References Cited

U.S. PATENT DOCUMENTS

| | | | | |
|---|---|---|---|---|
| 2020/0058972 A1* | 2/2020 | Kawai | ................ | H01M 10/625 |
| 2020/0194753 A1* | 6/2020 | Fujiwara | ............... | H01M 10/48 |
| 2020/0313146 A1* | 10/2020 | Busacca | ................ | H01M 4/661 |
| 2020/0403210 A1* | 12/2020 | Tse | ..................... | H01M 50/531 |
| 2021/0320367 A1 | 10/2021 | Yamashiro | | |
| 2023/0116057 A1* | 4/2023 | Yamashiro | ............ | H01M 50/15 |
| | | | | 429/149 |
| 2024/0055700 A1* | 2/2024 | Okabe | ................ | H01M 10/658 |

FOREIGN PATENT DOCUMENTS

| | | |
|---|---|---|
| JP | 2017-054823 A | 3/2017 |
| JP | 2018-081841 A | 5/2018 |
| JP | 2019-128991 A | 8/2019 |
| WO | 2020/031737 A1 | 2/2020 |

\* cited by examiner

FIG. 20

| | | FIRST SURFACE PRESSURE | | MAGNITUDE OF SECOND SURFACE PRESSURE [Mpa] | ASPECT RATIO | EVALUATION FOR FATIGUE BREAKAGE | CELL RESISTANCE | |
|---|---|---|---|---|---|---|---|---|
| | | MAGNITUDE [Mpa] | HEIGHT [mm] | | | | INCREASE RATE [%] | EVALUATION |
| COMPARATIVE EXAMPLE | 1 | 3 | 0.1 | 0.5 | 1.5 | C | 99 | A |
| | 2 | 3 | 0.5 | 0.5 | 1.5 | B | 100 | A |
| | 3 | 3 | 0.8 | 0.5 | 1.5 | B | 100 | A |
| | 4 | 3 | 0.9 | 0.5 | 1.5 | B | 100 | A |
| EXAMPLE | 5 | 3 | 1 | 0.5 | 1.5 | A | 100 | A |
| | 6 | 3 | 1.1 | 0.5 | 1.5 | A | 101 | A |
| | 7 | 3 | 1.2 | 0.5 | 1.5 | A | 101 | A |
| | 8 | 3 | 1.5 | 0.5 | 1.5 | A | 100 | A |
| COMPARATIVE EXAMPLE | 11 | 1.2 | 1 | 0.5 | 1.5 | C | 101 | A |
| | 12 | 1.3 | 1 | 0.5 | 1.5 | B | 100 | A |
| | 13 | 1.4 | 1 | 0.5 | 1.5 | B | 101 | A |
| EXAMPLE | 14 | 1.5 | 1 | 0.5 | 1.5 | A | 100 | A |
| | 15 | 1.6 | 1 | 0.5 | 1.5 | A | 100 | A |
| | 16 | 1.7 | 1 | 0.5 | 1.5 | A | 100 | A |
| | 17 | 1.8 | 1 | 0.5 | 1.5 | A | 100 | A |
| | 18 | 1.5 | 1 | 0.5 | 1.5 | A | 100 | A |
| | 19 | 1.5 | 1 | 0.7 | 1.5 | A | 102 | A |
| | 20 | 1.5 | 1 | 0.9 | 1.5 | A | 101 | A |
| | 21 | 1.5 | 1 | 1.0 | 1.5 | A | 104 | A |
| | 22 | 1.5 | 1 | 1.1 | 1.5 | A | 110 | B |
| | 23 | 1.5 | 1 | 1.2 | 1.5 | A | 111 | B |
| | 24 | 1.5 | 1 | 1.3 | 1.5 | A | 110 | B |
| | 25 | 1.5 | 1 | 1.4 | 1.5 | A | 112 | B |
| | 26 | 1.5 | 1 | 1.5 | 1.5 | A | 113 | B |
| COMPARATIVE EXAMPLE | 27 | 1.3 | 1 | 0.8 | 1.4 | B | 100 | A |
| | 28 | 1.4 | 1 | 0.9 | 1.4 | B | 100 | A |
| EXAMPLE | 29 | 1.5 | 1 | 1.0 | 1.4 | A | 100 | A |
| | 30 | 1.6 | 1 | 1.1 | 1.4 | A | 100 | A |
| | 31 | 1.7 | 1 | 1.2 | 1.4 | A | 100 | A |

FIG. 21

| | | FIRST SURFACE PRESSURE | | MAGNITUDE OF SECOND SURFACE PRESSURE [Mpa] | ASPECT RATIO | EVALUATION FOR FATIGUE BREAKAGE | CELL RESISTANCE | |
|---|---|---|---|---|---|---|---|---|
| | | MAGNITUDE [Mpa] | HEIGHT [mm] | | | | INCREASE RATE [%] | EVALUATION |
| COMPARATIVE EXAMPLE | 32 | 1.3 | 1 | 0.8 | 1.5 | C | 100 | A |
| | 33 | 1.4 | 1 | 0.9 | 1.5 | B | 100 | A |
| EXAMPLE | 34 | 1.5 | 1 | 1.0 | 1.5 | A | 100 | A |
| | 35 | 1.6 | 1 | 1.1 | 1.5 | A | 100 | A |
| | 36 | 1.7 | 1 | 1.2 | 1.5 | A | 100 | A |
| COMPARATIVE EXAMPLE | 37 | 1.3 | 1 | 0.8 | 1.6 | C | 100 | A |
| | 38 | 1.4 | 1 | 0.9 | 1.6 | C | 100 | A |
| EXAMPLE | 39 | 1.5 | 1 | 1.0 | 1.6 | A | 100 | A |
| | 40 | 1.6 | 1 | 1.1 | 1.6 | A | 100 | A |
| | 41 | 1.7 | 1 | 1.2 | 1.5 | A | 100 | A |
| | 42 | 3 | 6 | 1.0 | 9.9 | A | 100 | A |
| | 43 | 3 | 6 | 2.0 | 9.9 | A | 100 | A |
| | 44 | 3 | 6 | 2.4 | 9.9 | A | 100 | A |
| | 45 | 3 | 6 | 2.5 | 9.9 | A | 100 | A |
| | 46 | 3 | 6 | 2.6 | 9.9 | A | 110 | B |
| | 47 | 3 | 6 | 2.7 | 9.9 | A | 111 | B |
| | 48 | 3 | 6 | 2.8 | 9.9 | A | 113 | B |
| | 49 | 3 | 6 | 1.0 | 10 | A | 100 | A |
| | 50 | 3 | 6 | 2.0 | 10 | A | 100 | A |
| | 51 | 3 | 6 | 2.4 | 10 | A | 100 | A |
| | 52 | 3 | 6 | 2.5 | 10 | A | 100 | A |
| | 53 | 3 | 6 | 2.6 | 10 | A | 110 | B |
| | 54 | 3 | 6 | 2.7 | 10 | A | 112 | B |
| | 55 | 3 | 6 | 2.8 | 10 | A | 115 | C |
| | 56 | 3 | 6 | 1.0 | 10.1 | A | 100 | A |
| | 57 | 3 | 6 | 2.0 | 10.1 | A | 100 | A |
| | 58 | 3 | 6 | 2.4 | 10.1 | A | 100 | A |
| | 59 | 3 | 6 | 2.5 | 10.1 | A | 100 | A |
| | 60 | 3 | 6 | 2.6 | 10.1 | A | 112 | B |
| | 61 | 3 | 6 | 2.7 | 10.1 | A | 115 | C |
| | 62 | 3 | 6 | 2.8 | 10.1 | A | 118 | C |

POWER STORAGE DEVICE CONTAINED BY EXPANSION RESTRAINT MODULE

CROSS-REFERENCE TO RELATED APPLICATION

This application claims priority to Japanese Patent Application No. 2021-029770 filed on Feb. 26, 2021, incorporated herein by reference in its entirety.

BACKGROUND

1. Technical Field

The present disclosure relates to a power storage device.

2. Description of Related Art

Japanese Unexamined Patent Application Publication No. 2017-054823 (JP 2017-054823 A) discloses a secondary battery including a case that is formed in a container shape having an opening on an upper surface side and houses an element related to charging and discharging, and a lid body (closing part) that closes the opening on the upper surface side of the case. The secondary battery is provided with a reinforcing part. The reinforcing part is fitted on the lid body so as to cover an upper surface of the case closed by the lid body, and is welded and fixed to an outer surface intersecting the upper surface.

Japanese Unexamined Patent Application Publication No. 2012-113961 (JP 2012-113961 A) discloses a power storage device. The power storage device includes a plurality of power storage elements arranged in a predetermined direction, a spacer disposed between the two power storage elements, and a restraining mechanism that generates a force for interposing the power storage elements and spacer in the predetermined direction. Each power storage element has a power generation element and a case that houses the power generation element in a sealed state by being partially welded. The spacer is provided with a pressing part that protrudes in the predetermined direction and comes into contact with a welded portion of the case.

SUMMARY

In each power storage cell constituting a power storage device, an opening is provided on an upper side of a case, an electrode body is housed in the case through the opening, and an upper edge portion of the case and a lid body are welded to each other. The case is closed by the lid body, and a sealing part (welded part) is formed between the upper edge portion of the case and the lid body. In a configuration disclosed in JP 2017-054823 A, the reinforcing part is fitted on the lid body so as to cover the upper surface of the case closed by the lid body, and is welded and fixed to the outer surface intersecting the upper surface.

The reinforcing part is likely to function effectively when employed in a small-sized battery having a narrow shape, and breakage of the case due to expansion of the electrode body in the case can be effectively suppressed by a presence of the reinforcing part. However, the reinforcing part does not suppress displacement with respect to swelling of the cell itself. Therefore, when the reinforcing part is employed in a large-sized battery having a wide shape, stress is likely to be concentrated on a welded portion of the reinforcing part at the time of expansion due to a large expansion amount of the electrode body, and breakage is likely to occur from a position of the reinforcing part. As a result, the case may be partially broken and unable to remain sealed.

The present disclosure provides a power storage device having a configuration capable of effectively suppressing breakage of a case of a power storage cell due to expansion of an electrode body in the case.

An aspect of the present disclosure relates to a power storage device. The power storage cell includes a plurality of power storage cells, a spacer, and a restraining member. The power storage cells are arranged in one direction. The spacer is disposed between two adjacent power storage cells among the power storage cells. The restraining member is configured to restrain the power storage cells and the spacer by applying a load along the one direction to the power storage cells and the spacer. Each of the power storage cells includes a case with a closed bottom, an electrode body housed in the case, and a lid body configured to close an upper opening of the case, the lid body being welded to an upper edge portion of the case. A sealing part is formed between the case and the lid body by welding the case and the lid body to each other. An outer surface of the case includes an end surface portion extending in a plane direction orthogonal to the one direction. The end surface portion is formed in a rectangular shape having a long side extending in a width direction and a short side extending in a height direction, and has an aspect ratio of 1.4 or more, the aspect ratio being indicated by a length of the long side to a length of the short side. The electrode body has a principal surface region adjacent to an inner surface of a part of the case that constitutes the end surface portion. The end surface portion includes a first region between a lower end of a sealing part projected image and an upper end of a principal surface region projected image, and a second region between the upper end of the principal surface region projected image and a lower end of the principal surface region projected image. The sealing part projected image is defined as a projection image projected onto the end surface portion when the sealing part is projected onto the end surface portion along the one direction, and the principal surface region projected image is defined as a projection image projected onto the end surface portion when the principal surface region is projected onto the end surface portion along the one direction. In a state where the power storage cells and the spacer are restrained by the restraining member, at least a part of the first region receives a pressure of a first surface pressure from the spacer, and at least a part of the second region receives a pressure of a second surface pressure from the spacer. The first surface pressure is higher than the second surface pressure and is in a range of 1.5 MPa or more and 3.5 MPa or less. A height of the at least a part of the first region receiving the pressure of the first surface pressure from the spacer is 1 mm or more.

In the aspect, a difference between the first surface pressure and the second surface pressure may be 0.5 MPa or more, and the second surface pressure may be 0.01 MPa or more.

In the aspect, the first region may include a region between an upper end of the sealing part projected image and the upper end of the principal surface region projected image.

In the aspect, the spacer may have a first portion that contacts the first region and a second portion that contacts the second region, and the first portion may be formed of a member harder than a member of the second portion.

In the aspect, the spacer may have a first portion that contacts the first region and a second portion that contacts the second region, and in the one direction, the first portion may have a thickness thicker than a thickness of the second portion.

In the aspect, the spacer may have a first portion that contacts the first region and a plurality of second portions that contacts the second region, and the second portions may be provided apart from each other at an interval.

According to the aspect, it is possible to effectively suppress breakage of a case of a power storage cell due to expansion of an electrode body in the case.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 20 is a table showing examples and comparative examples related to the present disclosure; and FIG. 21 is a table showing examples and comparative examples related to the present disclosure.

DETAILED DESCRIPTION OF EMBODIMENTS

Figure 1:
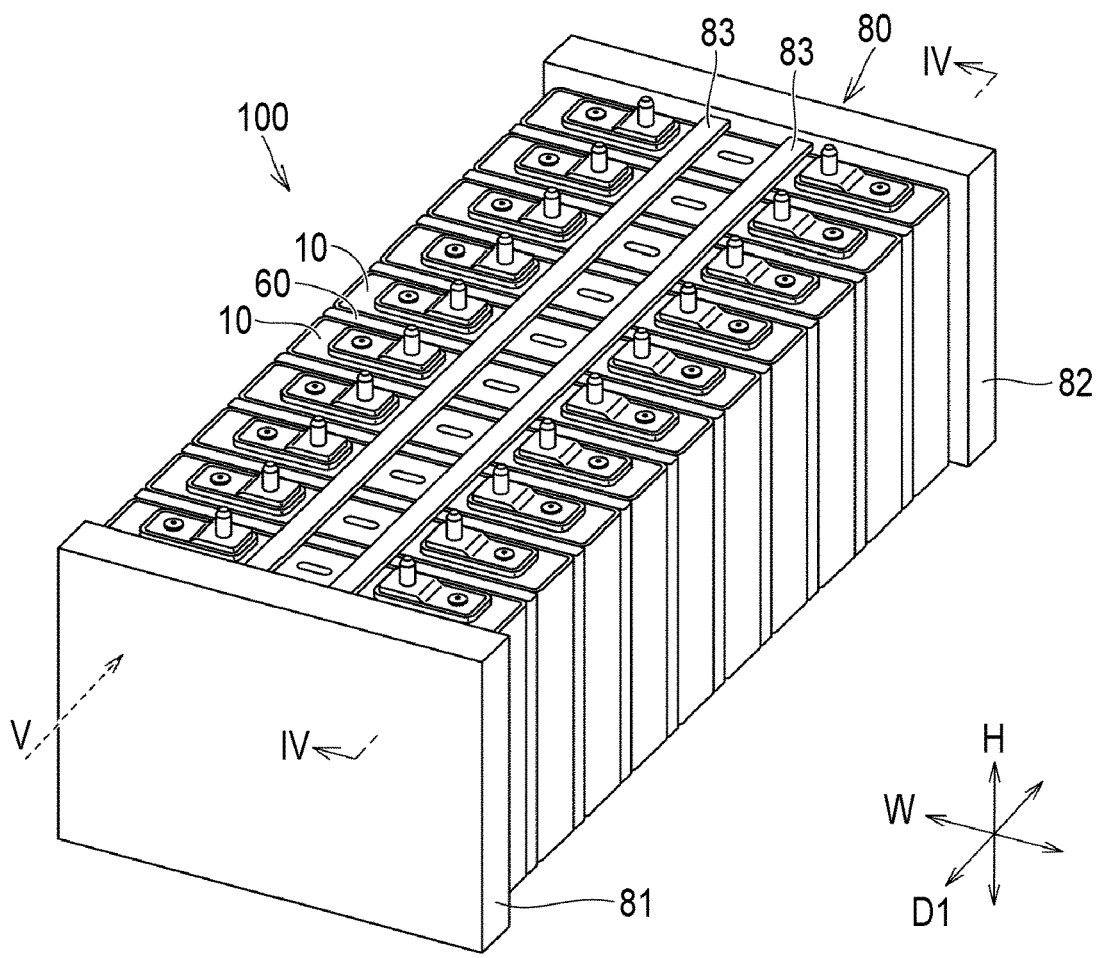
FIG. 1 is a perspective view showing a power storage device according to Embodiment 1.

Hereinafter, embodiments of the present disclosure will be described. In the embodiments described below, when the number, amount, or the like is mentioned, the scope of the present disclosure is not necessarily limited to the number, amount, or the like, unless otherwise specified. Each component is not necessarily needed for the present disclosure unless otherwise specified. The same parts and corresponding parts are denoted by the same reference numerals, and overlapping descriptions may not be repeated.

Embodiment 1

Power Storage Device 100

FIG. 1 is a perspective view showing a power storage device 100 according to Embodiment 1. The power storage device 100 is typically a lithium ion battery. The power storage device 100 includes a plurality of power storage cells 10, a plurality of spacers 60, and a restraining member 80.

The power storage cells 10 and the spacers 60 are arranged in one direction D1. Each of the spacers 60 is disposed between two adjacent power storage cells 10 among the power storage cells. The restraining member 80 restrains the power storage cells 10 and the spacers 60 by applying a load along the one direction D1 to the power storage cells 10 and the spacers 60.

For example, the restraining member 80 includes a restraining plate 81, a restraining plate 82, and a restraining band 83. The restraining plate 81 is disposed at a first end of the power storage device 100 in the one direction D1, and the restraining plate 82 is disposed at a second end of the power storage device 100 in the one direction D1. The restraining band 83 connects the restraining plates 81, 82 and restrains the restraining plates 81, 82. The power storage cells 10 and the spacers 60 disposed between the restraining plates 81, 82 are pressed by the restraining plates 81, 82 and are restrained between the restraining plates 81, 82.

Power Storage Cell 10

Figure 2:
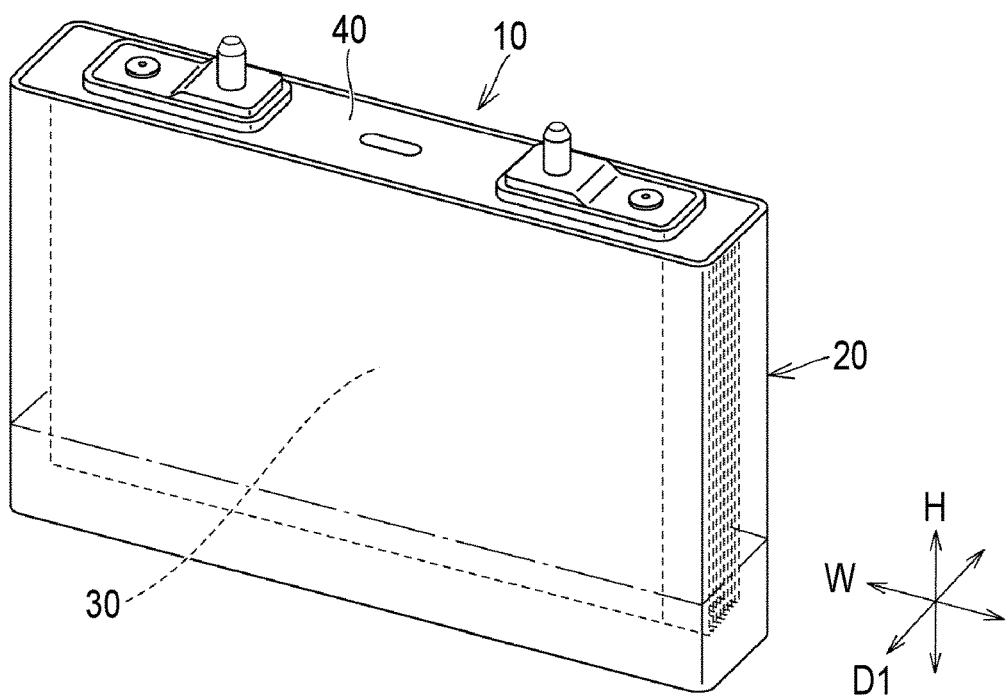
FIG. 2 is a perspective view showing a power storage cell included in the power storage device of FIG. 1.
Figure 3:
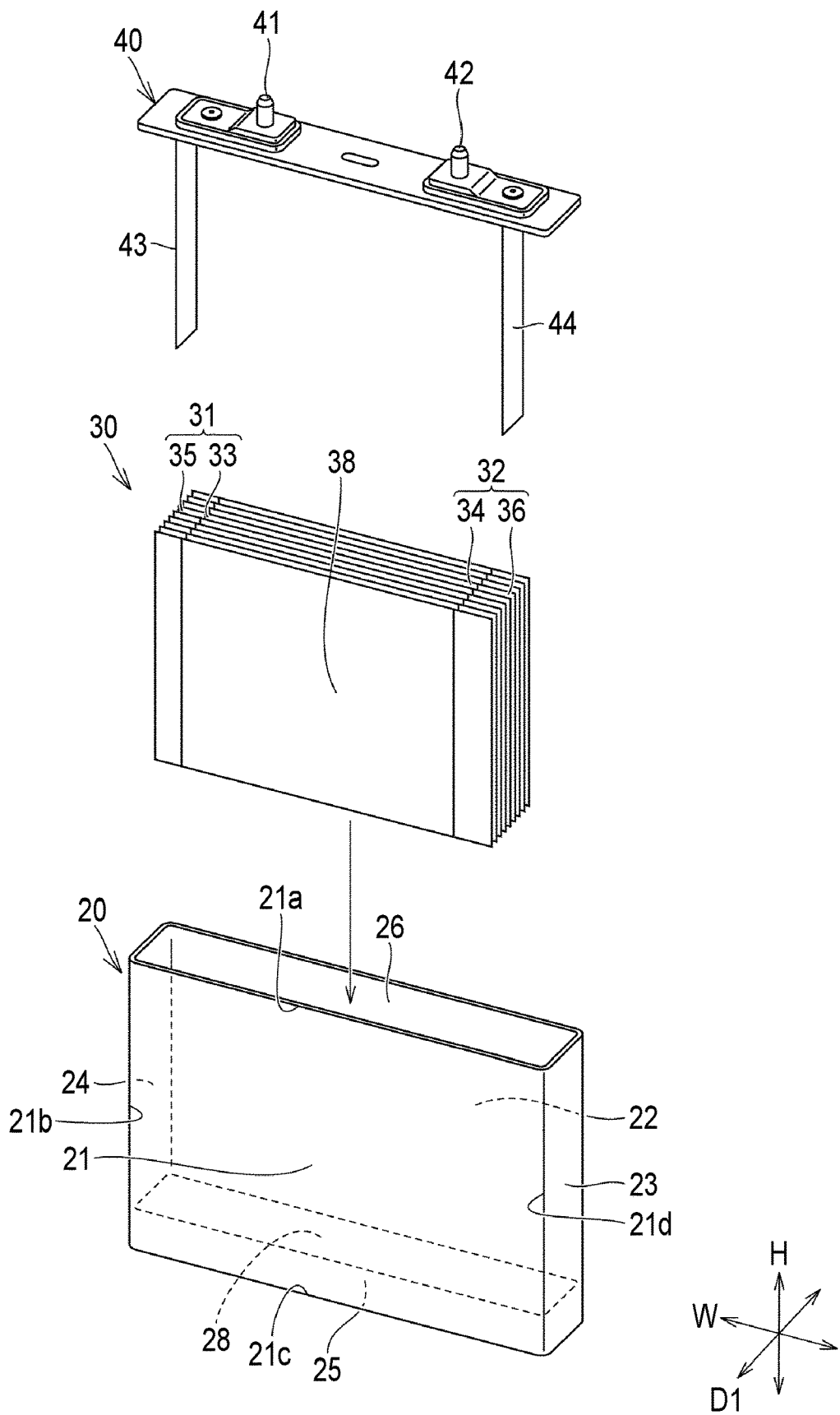
FIG. 3 is an exploded perspective view showing the power storage cell shown in FIG. 2.

FIG. 2 is a perspective view showing the power storage cell 10. FIG. 3 is an exploded perspective view showing the power storage cell 10. As shown in FIGS. 2 and 3, the power storage cell 10 is a so-called square secondary battery, and has a flat rectangular parallelepiped shape as a whole. The power storage cell 10 includes a case 20, an electrode body 30, and a lid body 40.

Although not particularly limited, the size of the square case of this type of battery may be, for example, 80 mm to 1000 mm in length on the long side of the case 20 and the lid body 40, 8 mm to 40 mm in length (that is, the thickness of the case 20) on the short side of the case 20 and the lid body 40, and 45 mm to 150 mm in height of the case 20. The size of the electrode body 30 need only be defined as a size with which the electrode body 30 can be housed in the square case to be used, and is not particularly limited.

Case 20

The case 20 has an upper opening 26 that is open upward, and is formed in a bottomed cylindrical shape as a whole. The electrode body 30 is housed in the case 20 together with an electrolyte 28. The electrolyte 28 contains, for example, a lithium salt and a solvent. The lid body 40 is welded to an upper edge portion of the case 20 to close the upper opening 26 of the case 20.

An outer surface of the case 20 includes end surface portions 21, 22, side surface portions 23, 24, and a bottom surface portion 25. The end surface portion 21 and the end surface portion 22 are arranged in the one direction D1, and the side surface portion 23 and the side surface portion 24 are arranged in a width direction W. The end surface portions 21, 22 and the side surface portions 23, 24 are formed so as to extend upward (height direction H) from a peripheral edge portion of the bottom surface portion 25. The end surface portions 21, 22 extend in a plane direction orthogonal to the one direction D1.

Figure 4:
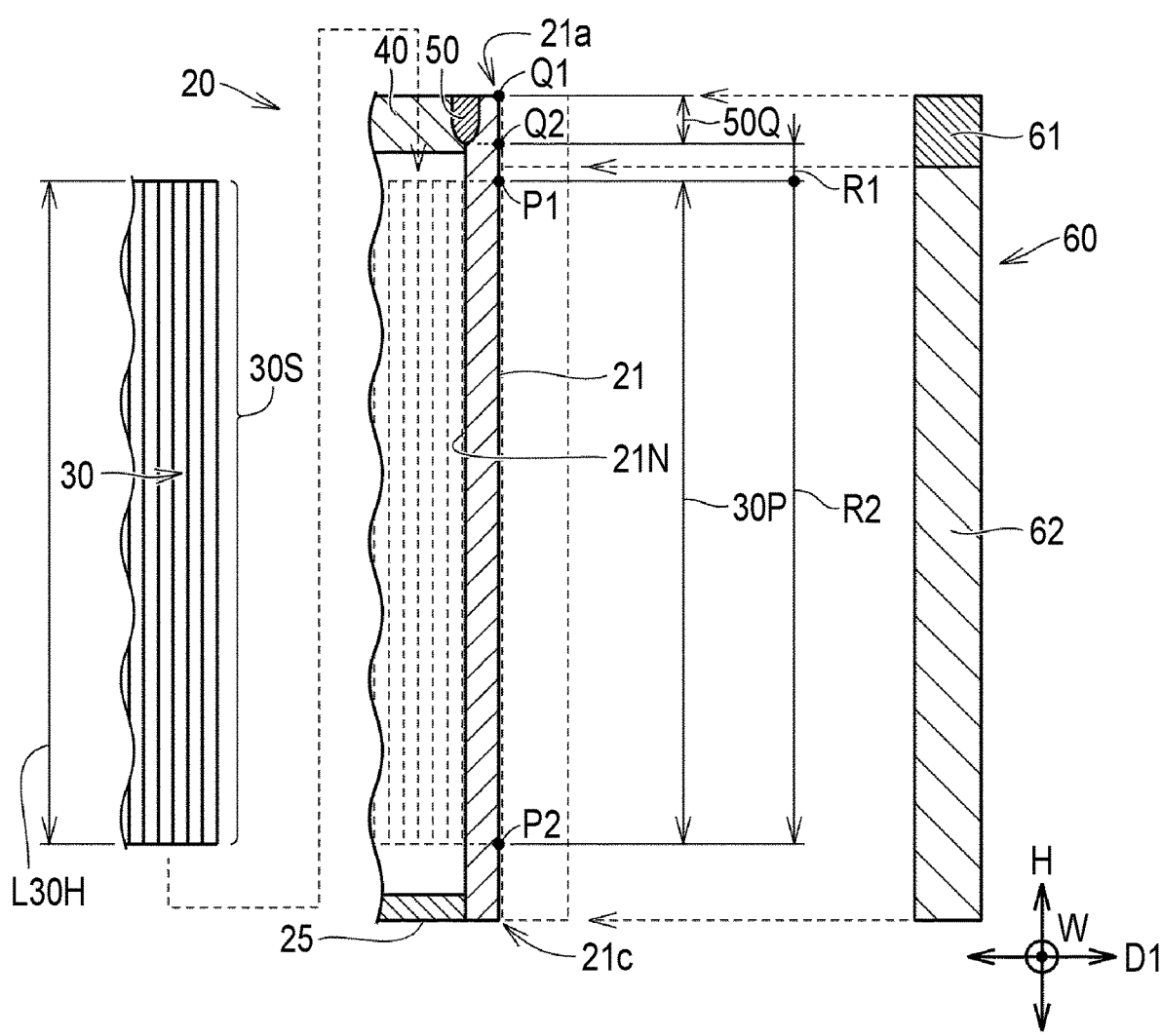
FIG. 4 is an exploded cross-sectional view of a power storage cell and a spacer included in the power storage device of FIG. 1, and shows a cross-sectional structure of the power storage cell and the spacer at a position along IV-IV line in FIG. 1.
Figure 5:
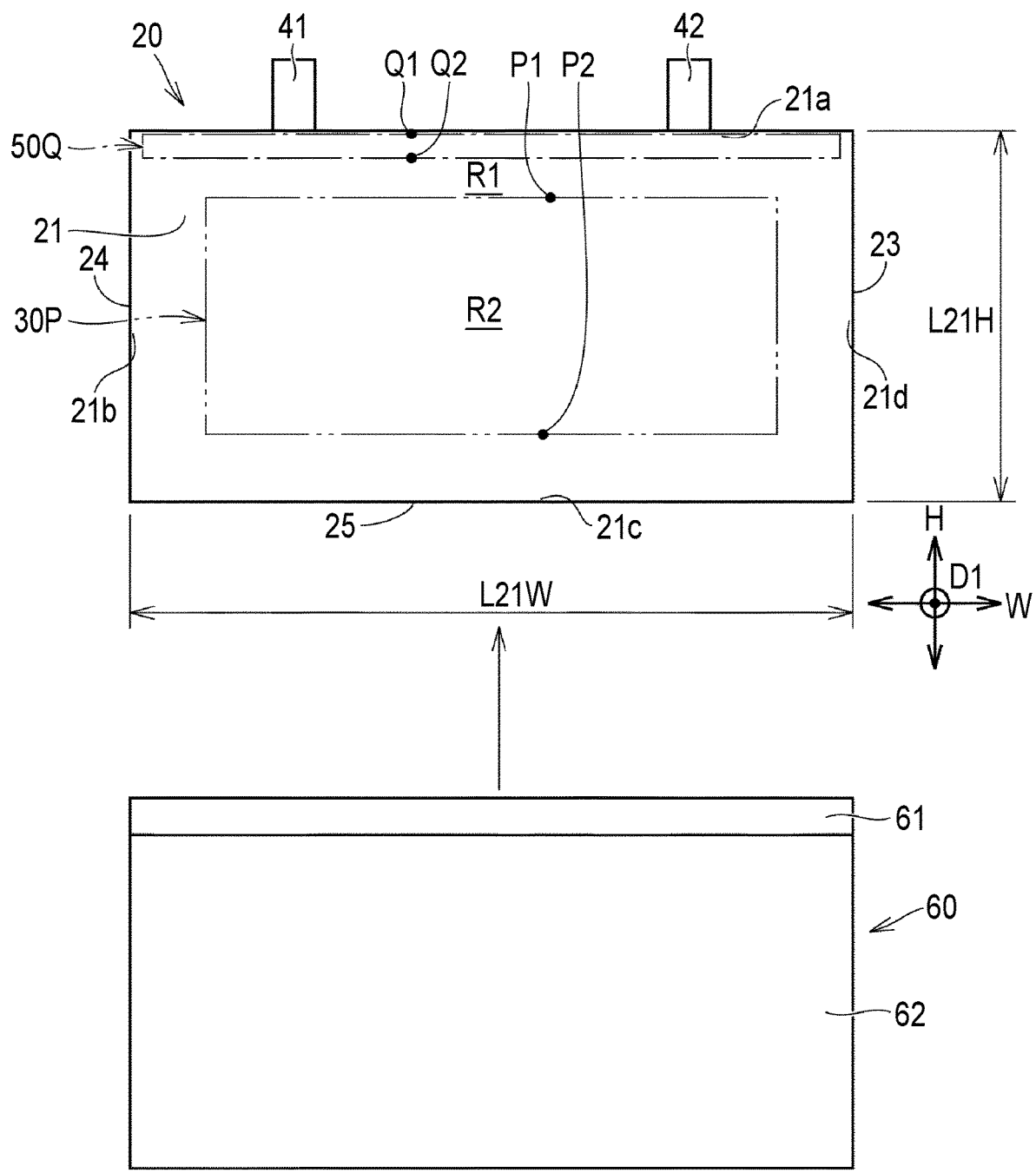
FIG. 5 is an exploded view of the power storage cell and the spacer included in the power storage device of FIG. 1, and shows a structure of the power storage cell and the spacer as viewed in a direction along an arrow V (one direction D1) in FIG. 1.

FIG. 4 is an exploded cross-sectional view of the power storage cell 10 and the spacer 60 included in the power storage device 100 of FIG. 1, and shows a cross-sectional structure of the power storage cell 10 and the spacer 60 at a position along IV-IV line in FIG. 1. FIG. 5 is an exploded view of the power storage cell 10 and the spacer 60 included in the power storage device 100 of FIG. 1, and shows a structure of the power storage cell 10 and the spacer 60 as viewed in a direction along an arrow V (one direction D1) in FIG. 1.

As shown in FIGS. 3 to 5 (particularly FIG. 5), the end surface portion 21 of the case 20 is formed in a rectangular shape having long sides 21a, 21c extending in the width direction W and short sides 21b, 21d extending in the height direction H. The short sides 21b, 21d have a length L21H, and the long sides 21a, 21c have a length L21W. An aspect ratio indicated by the length L21W of the long sides 21a, 21c with respect to the length L21H of the short sides 21b, 21d is set to 1.4 or more, and preferably set to 1.5 or more.

Lid Body 40

The lid body 40 is formed in a plate shape. A positive electrode external terminal 41 and a negative electrode external terminal 42 are disposed on an upper surface of the lid body 40 at an interval in the width direction W. A positive electrode current collector plate 43 and a negative electrode current collector plate 44 are disposed on a lower surface of the lid body 40. The positive electrode current collector plate 43 is connected to the positive electrode external terminal 41, and the negative electrode current collector plate 44 is connected to the negative electrode external terminal 42. Although the positive electrode current collector plate 43 and the negative electrode current collector plate 44 are schematically shown in FIG. 3, the positive electrode current collector plate 43 and the negative electrode current collector plate 44 are electrically connected to a positive electrode 31 and a negative electrode 32 in the electrode body 30, respectively.

Sealing Part 50

A sealing part 50 (FIG. 4) is formed between the case 20 and the lid body 40 by welding the case 20 and the lid body 40 to each other. Here, the lid body 40 is disposed inside the upper edge portion of the case 20. The sealing part 50 is formed between an inner peripheral surface portion of the case 20 that forms the upper opening 26 and an outer peripheral surface portion of the lid body 40, has a predetermined depth, and extends annularly as a whole along an outer peripheral edge portion of the lid body 40.

Electrode Body 30

As shown in FIG. 3, the electrode body 30 is a laminate type power generation element. As will be described below with reference to FIGS. 14 and 15, the technical idea of the present disclosure is not limited to the laminate type, and is applicable to a winding type power generation element (electrode body 30A). The electrode body 30 shown in FIG. 3 is formed, for example, by alternately laminating the positive electrode 31 and the negative electrode 32 with a separator 38 interposed between the positive electrode 31 and the negative electrode 32. The electrode body 30 as a whole has an outer shape of a flat rectangular parallelepiped like the case 20. The electrode body 30 is housed in the case 20 such that a longitudinal direction of the flat rectangular parallelepiped coincides with a longitudinal direction of the case 20.

The positive electrode 31 includes a positive electrode current collector 33 and a positive electrode mixture layer 35. The positive electrode current collector 33 is electrically connected to the positive electrode external terminal 41 via the positive electrode current collector plate 43. The positive electrode mixture layer 35 is formed on both sides or one side of the positive electrode current collector 33. The negative electrode 32 includes a negative electrode mixture layer 34 and a negative electrode current collector 36. The negative electrode current collector 36 is electrically connected to the negative electrode external terminal 42 via the negative electrode current collector plate 44. The negative electrode mixture layer 34 is formed on both sides or one side of the negative electrode current collector 36. The separator 38 is a band-shaped film. The separator 38 is disposed between the positive electrode 31 and the negative electrode 32, and electrically insulates the positive electrode 31 and the negative electrode 32.

Principal Surface Region 30S

The electrode body 30 has a principal surface region 30S on an outer surface of the electrode body 30 itself. When the electrode body 30 is housed in the case 20, the principal surface region 30S of the electrode body 30 is adjacent to an inner surface 21N (FIG. 4) of a part of the case 20 that constitutes the end surface portion 21.

Principal Surface Region Projected Image 30P

The principal surface region 30S is projected onto the end surface portion 21 of the case 20 along the one direction D1, whereby a principal surface region projected image 30P (FIG. 5) is formed on the end surface portion 21 of the case 20. The principal surface region projected image 30P has an upper end P1 and a lower end P2 extending parallel to the width direction W.

Sealing Part Projected Image 50Q

The sealing part 50 is projected onto the end surface portion 21 of the case 20 along the one direction D1, whereby a sealing part projected image 50Q is formed on the end surface portion 21 of the case 20. The sealing part projected image 50Q also has an upper end Q1 and a lower end Q2 extending parallel to the width direction W.

First Region R1 and Second Region R2

The end surface portion 21 of the case 20 includes a first region R1 formed between the lower end Q2 of the sealing part projected image 50Q and the upper end P1 of the principal surface region projected image 30P, and a second region R2 formed between the upper end P1 of the principal surface region projected image 30P and the lower end P2 of the principal surface region projected image 30P. The first region R1 may be an entire region between the lower end Q2 of the sealing part projected image 50Q and the upper end P1 of the principal surface region projected image 30P, and may be a partial region between the lower end Q2 of the sealing part projected image 50Q and the upper end P1 of the principal surface region projected image 30P. Similarly, the second region R2 may be an entire region between the upper end P1 of the principal surface region projected image 30P and the lower end P2 of the principal surface region projected image 30P, and may be a partial region between the upper end P1 of the principal surface region projected image 30P and the lower end P2 of the principal surface region projected image 30P.

Spacer 60

As shown in FIGS. 4 and 5, in the width direction W, the spacer 60 has a width dimension larger than the width of the electrode body 30. In the height direction H, the spacer 60 has a height dimension larger than the height of the electrode body 30.

In a state where the power storage cells 10 and the spacer 60 are restrained by the restraining member 80 (FIG. 1), at least a part of the first region R1 on the end surface portion 21 of the case 20 receives a pressure of a first surface pressure from the spacer 60, and at least a part of the second region R2 on the end surface portion 21 of the case 20 receives a pressure of a second surface pressure from the spacer 60. The height of at least a part of the first region R1 receiving the pressure of the first surface pressure from the spacer 60 is 1 mm or more. The first surface pressure is higher than the second surface pressure and is in a range of 1.5 MPa or more and 3.5 MPa or less.

Here, the spacer 60 has a flat plate shape. The spacer 60 includes a first portion 61 and a second portion 62. The first portion 61 is disposed to contact the first region R1 in the end surface portion 21 of the case 20. The second portion 62 is disposed to contact the second region R2 in the end surface portion 21 of the case 20. The first region R1 may be formed to include a region between the upper end Q1 of the sealing part projected image 50Q and the upper end P1 of the principal surface region projected image 30P.

The second portion 62 is made of an elastic member, such as a silicon oxide fiber material or rubber. Due to expansion of the electrode body 30, an internal difference in salt concentration may occur or a distance between the positive and negative electrodes may be increased, resulting in an increase in internal resistance. As the elastic member constituting the second portion 62, for example, a member that is soft enough to absorb expansion of a central portion of the electrode body 30 and alleviate the increase in internal resistance as described above is used. Further, the elastic member constituting the second portion 62 may have such characteristics as to restrain the electrode body 30 without being deformed due to an increase in gas pressure in the case 20.

The first portion 61 is formed of a member harder than the elastic member constituting the second portion 62. As the hard member, for example, polypropylene resin is used. The first portion 61 and the second portion 62 may be manufactured by integral molding. Alternatively, the first portion 61 and the second portion 62 may be joined to each other after being separately manufactured.

Action and Effect

When charging and discharging are repeated in the power storage device 100, a temperature of the electrode body 30 rises, and an internal pressure of the electrode body 30 also rises. In a case where no special measures are taken, the electrode body 30 may be deformed to swell greatly. In a case where the electrode body 30 swells greatly, a surface pressure acting between the electrode body 30 and the case 20 increases. The inner surface 21N (particularly, a portion of the inner surface 21N that faces the electrode body 30) of the part of the case 20 that constitutes the end surface portion 21 is pressed by the principal surface region 30S of the electrode body 30. As a result, the part of the case 20 that constitutes the end surface portion 21 is deformed to swell, which may lead to breakage of the case 20.

With respect to this, in the power storage device 100 of the present embodiment, the end surface portion 21 of the case 20 includes the first region R1 formed between the lower end Q2 of the sealing part projected image 50Q and the upper end P1 of the principal surface region projected image 30P, and the second region R2 formed between the upper end P1 of the principal surface region projected image 30P and the lower end P2 of the principal surface region projected image 30P, and in a state where the power storage cells 10 and the spacer 60 are restrained by the restraining member 80, at least a part of the first region R1 receives the pressure of the first surface pressure from the spacer 60, and at least a part of the second region R2 receives the pressure of the second surface pressure from the spacer 60, and the first surface pressure is higher than the second surface pressure and is in a range of 1.5 MPa or more and 3.5 MPa or less.

With the spacer 60, even when the electrode body 30 expands, the first portion 61 made of the hard member is elastically deformed to be recessed, and the vicinity of the sealing part 50 is restrained by the action of the first portion 61 made of the hard member (first surface pressure). In the two adjacent power storage cells 10, a beam structure including the sealing part 50 and the first portion 61 is formed in the vicinity of the height at which the sealing part 50 is positioned, and therefore, even in a case where the electrode body 30 expands, an increase of displacement of the sealing part 50 (welded part) is effectively suppressed.

Figure 6:
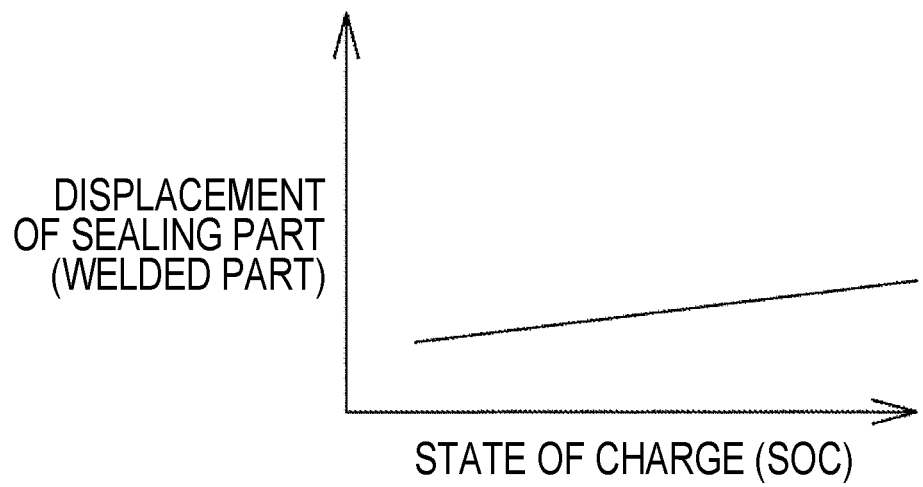
FIG. 6 is a graph showing a relationship between a state of charge and displacement of a sealing part (welded part) in the power storage cell included in the power storage device according to Embodiment 1.

FIG. 6 is a graph showing a relationship between a state of charge and displacement of a sealing part (welded part) in the power storage cell 10 included in the power storage device 100. As shown in FIG. 6, in the power storage device 100, the pressure having the above relationship acts on the first region R1 and the second region R2, and further, the surface pressure in a predetermined range acts on the first region R1, so that even when the state of charge (SOC) increases, an increase of displacement of the sealing part 50 (welded part) is effectively suppressed, and consequently, breakage of the case 20 due to expansion of the electrode body 30 in the case 20 of the power storage cell 10 can be effectively suppressed.

Other Configurations Relating to Embodiment 1

A difference between the first surface pressure and the second surface pressure may be 0.5 MPa or more, and the second surface pressure may be 0.01 MPa or more.

Here, the electrode body 30 is formed by, for example, laminating a positive electrode sheet, a separator, and a negative electrode sheet. The electrolyte 28 (FIG. 3) permeates the inside of the electrode body 30 (between the positive electrode sheet and the negative electrode sheet). When charging and discharging are repeated, in a case where no special measures are taken, an internal pressure in the central portion of the electrode body 30 becomes relatively higher than an internal pressure in a peripheral part of the electrode body 30, and the electrolyte 28 moves from the central portion to the peripheral edge portion of the electrode body 30. As a result, a difference in salt concentration occurs inside the electrode body 30, and the internal resistance may increase. The internal resistance can also be increased by an increase in distance between the positive electrode and the negative electrode due to expansion of the electrode body 30.

In addition, gas may be generated in the case 20, and the case 20 may expand due to a pressure of the gas. In this case, a gap is generated between the case 20 and the electrode body 30, and a state in which a part of the electrode body 30 is not sufficiently restrained is formed, and as a result, a capacity of the power storage cell 10 may decrease.

Figure 7:
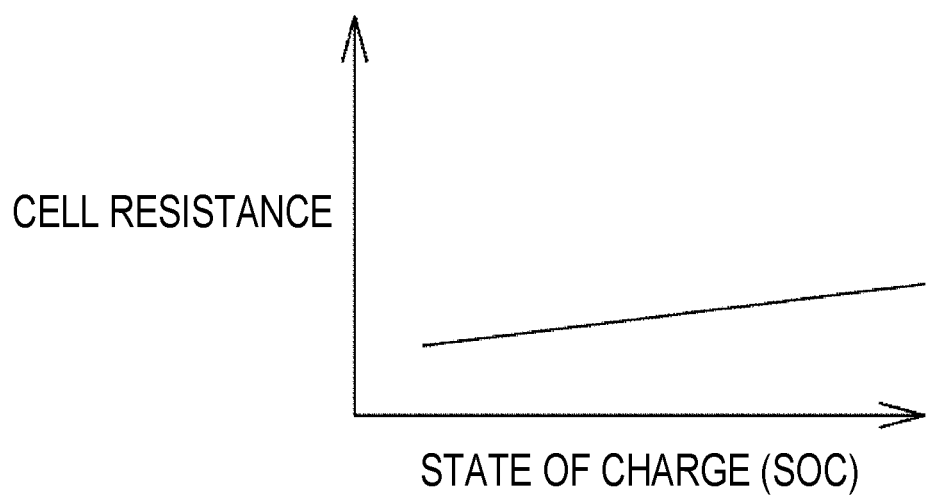
FIG. 7 is a graph showing a relationship between the state of charge and a cell resistance in the power storage cell included in the power storage device according to Embodiment 1.

FIG. 7 is a graph showing a relationship between the state of charge and a cell resistance in the power storage cell 10 included in the power storage device 100. As shown in FIG. 7, when the difference between the first surface pressure and the second surface pressure is 0.5 MPa or more and the second surface pressure is 0.01 MPa or more, the occurrence of the above event can be effectively suppressed, and consequently, the battery performance can be supported. In addition, even in a case where the power storage device 100 is mounted on a vehicle or the like, the movement of the electrode body 30 in the case 20 due to vibration received through the vehicle can be effectively suppressed.

Comparative Example 1 Relating to Embodiment 1

Figure 8:
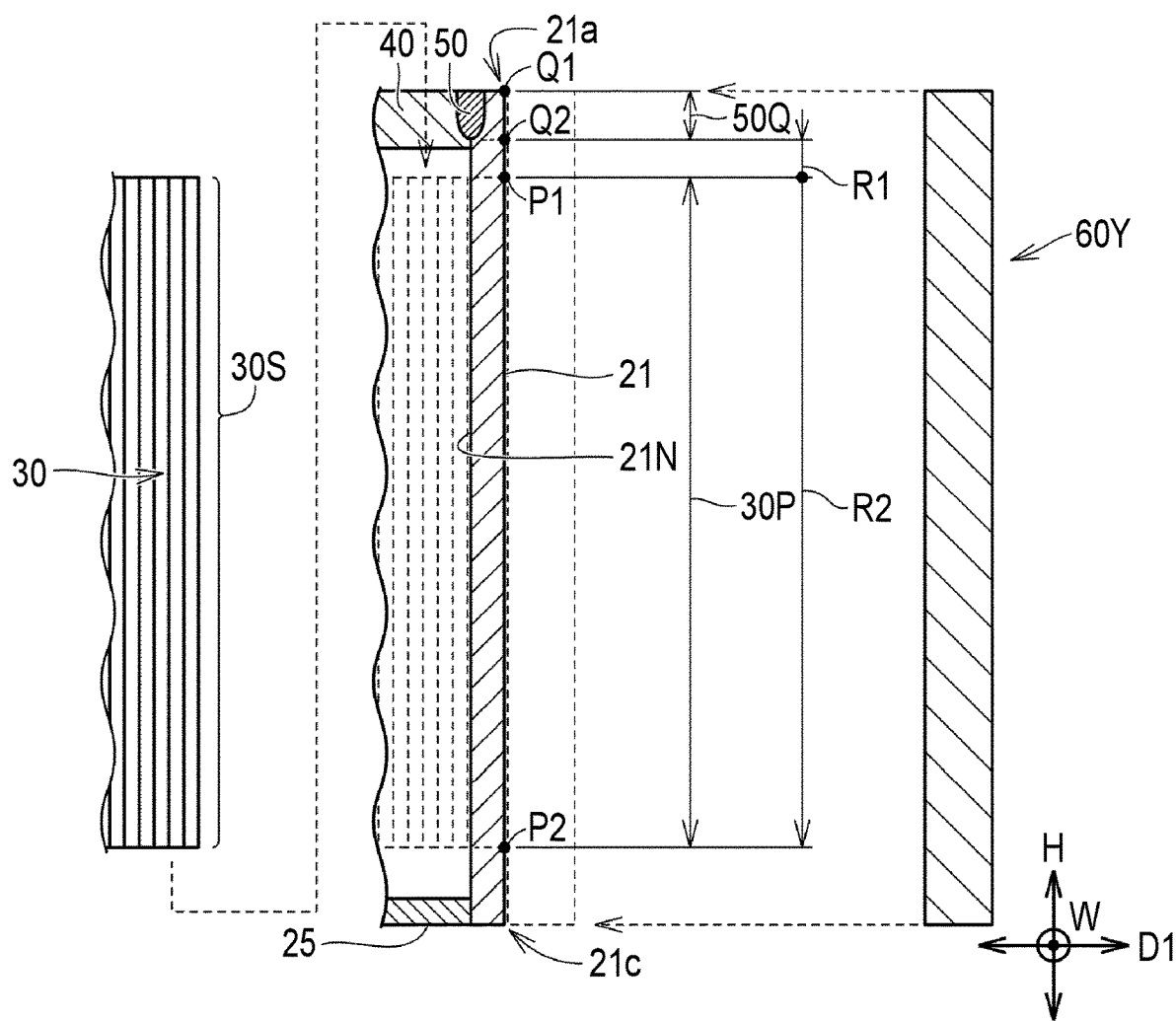
FIG. 8 is an exploded cross-sectional view of a power storage cell and a spacer included in a power storage device of Comparative Example 1 relating to Embodiment 1, and corresponds to FIG. 4 in Embodiment 1.

FIG. 8 is an exploded cross-sectional view of a power storage cell and a spacer included in a power storage device of Comparative Example 1 relating to Embodiment 1, and corresponds to FIG. 4 in Embodiment 1. Comparative Example 1 is different from Embodiment 1 in that a spacer 60Y is used instead of the spacer 60.

Although the spacer 60Y has the same outer shape as the spacer 60 (see FIG. 4), the spacer 60Y is different from the case of Embodiment 1 in that the spacer 60Y is composed of solely a material of a member corresponding to the second portion 62 of the spacer 60, and that the first surface pressure and the second surface pressure are the same.

Figure 9:
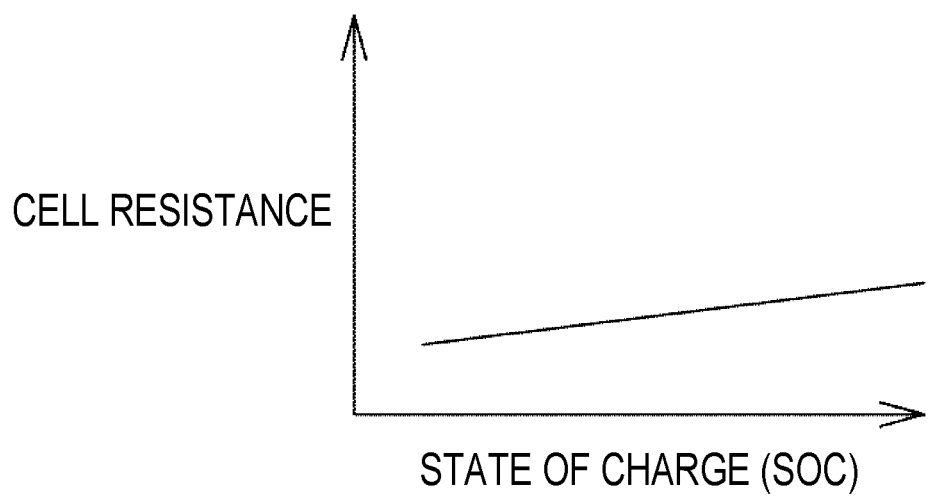
FIG. 9 is a graph showing a relationship between a state of charge and a cell resistance in the power storage cell included in the power storage device according to Comparative Example 1 relating to Embodiment 1.

As shown in FIG. 9, in a case where the spacer 60Y is composed of solely the material of the member corresponding to the second portion 62 of the spacer 60, the action and effect of the portion corresponding to the second portion 62 of the spacer 60 can be obtained, and for example, when the surface pressure is equal to or more than a predetermined value, an increase in distance between the positive electrode and the negative electrode due to expansion of the electrode body 30 can be suppressed, and an increase in internal resistance can also be suppressed, and consequently, the battery performance can be supported.

Figure 10:
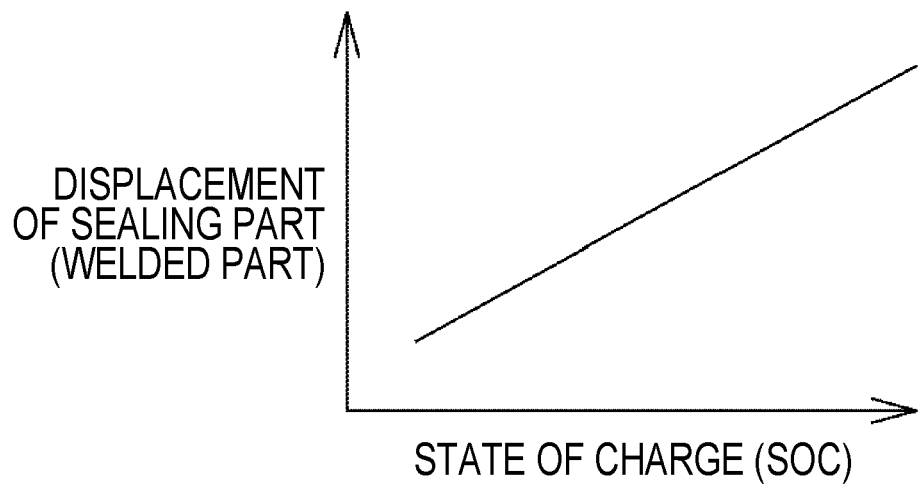
FIG. 10 is a graph showing a relationship between the state of charge and displacement of a sealing part (welded part) in the power storage cell included in the power storage device according to Comparative Example 1 relating to Embodiment 1.

However, as shown in FIG. 10, in a case where a configuration is not employed in which the first surface pressure is higher than the second surface pressure and is in a range of 1.5 MPa or more and 3.5 MPa or less, and the spacer 60Y having a simple plate shape is used, when the state of charge increases, displacement of the sealing part 50 (welded part) also increases, and as a result, it is difficult to suppress breakage of the case 20 due to expansion of the electrode body 30 in the case 20 of the power storage cell 10.

Comparative Example 2 Relating to Embodiment 1

Figure 11:
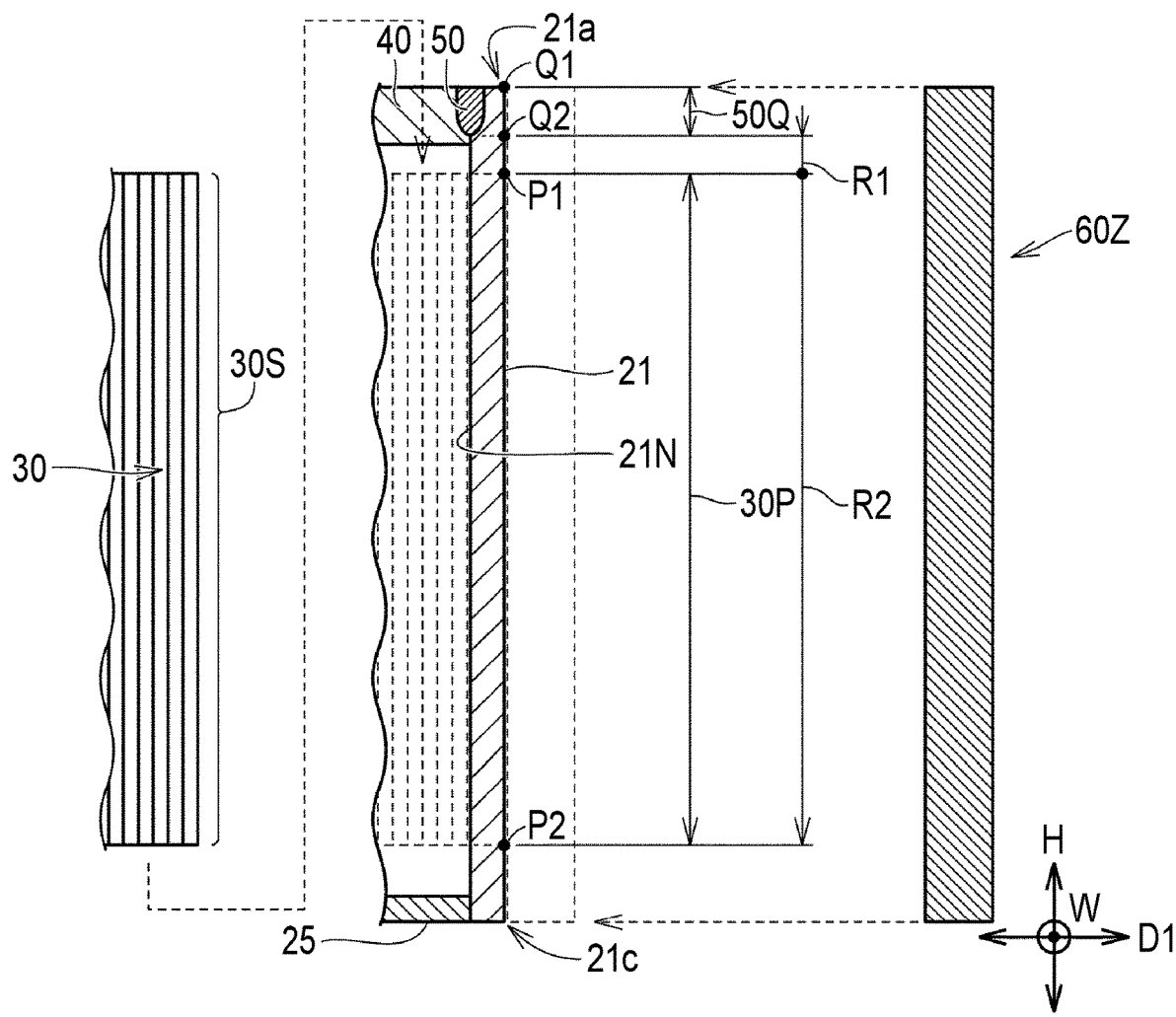
FIG. 11 is an exploded cross-sectional view of a power storage cell and a spacer included in a power storage device of Comparative Example 2 relating to Embodiment 1, and corresponds to FIG. 4 in Embodiment 1.

FIG. 11 is an exploded cross-sectional view of a power storage cell and a spacer included in a power storage device of Comparative Example 2 relating to Embodiment 1, and corresponds to FIG. 4 in Embodiment 1. Comparative Example 2 is different from Embodiment 1 in that a spacer 60Z is used instead of the spacer 60.

Although the spacer 60Z has the same outer shape as the spacer 60 (see FIG. 4), the spacer 60Z is different from the case of Embodiment 1 in that the spacer 60Z is composed of solely a material of a member corresponding to the first portion 61 of the spacer 60, and that the first surface pressure and the second surface pressure are the same.

Figure 12:
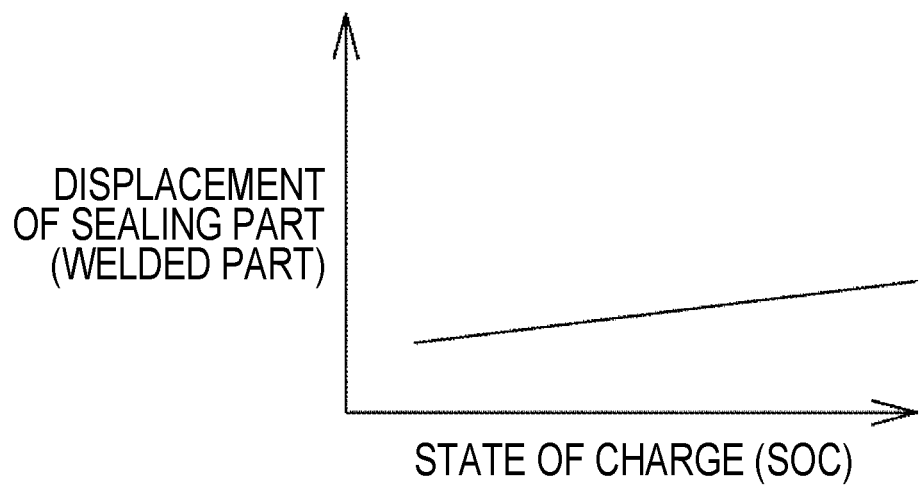
FIG. 12 is a graph showing a relationship between a state of charge and displacement of a sealing part (welded part) in the power storage cell included in the power storage device according to Comparative Example 2 relating to Embodiment 1.

As shown in FIG. 12, in a case where the spacer 60Z is composed of solely the material of the member corresponding to the first portion 61 of the spacer 60, the action and effect of the portion corresponding to the first portion 61 of the spacer 60 can be obtained, and for example, when the surface pressure is equal to or more than a predetermined value, an increase of displacement of the sealing part 50 (welded part) can be suppressed, and consequently, breakage of the case 20 due to expansion of the electrode body 30 in the case 20 of the power storage cell 10 can be suppressed.

Figure 13:
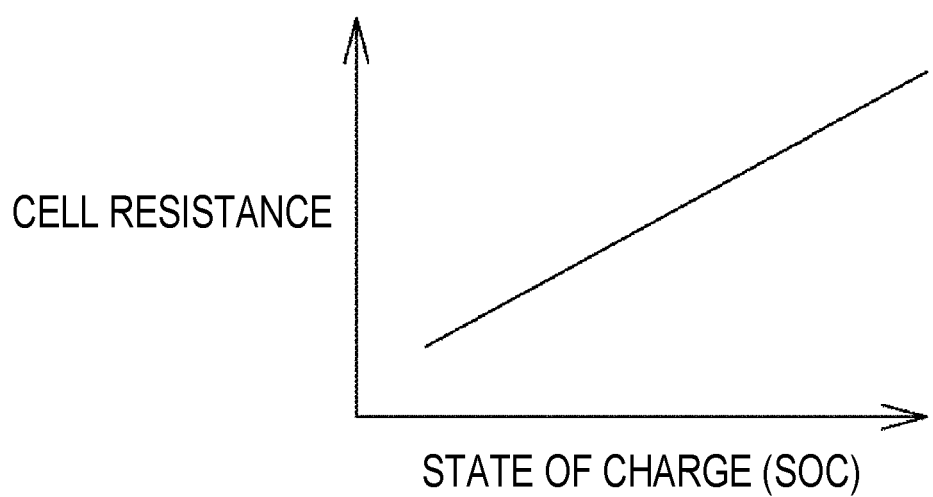
FIG. 13 is a graph showing a relationship between the state of charge and a cell resistance in the power storage cell included in the power storage device according to Comparative Example 2 relating to Embodiment 1.

However, as shown in FIG. 13, in a case where a configuration is not employed in which the first surface pressure is higher than the second surface pressure and is in a range of 1.5 MPa or more and 3.5 MPa or less, and the spacer 60Z having a simple plate shape is used, when the state of charge increases, the cell resistance increases, and it is difficult to support the battery performance.

Embodiment 2

Figure 14:
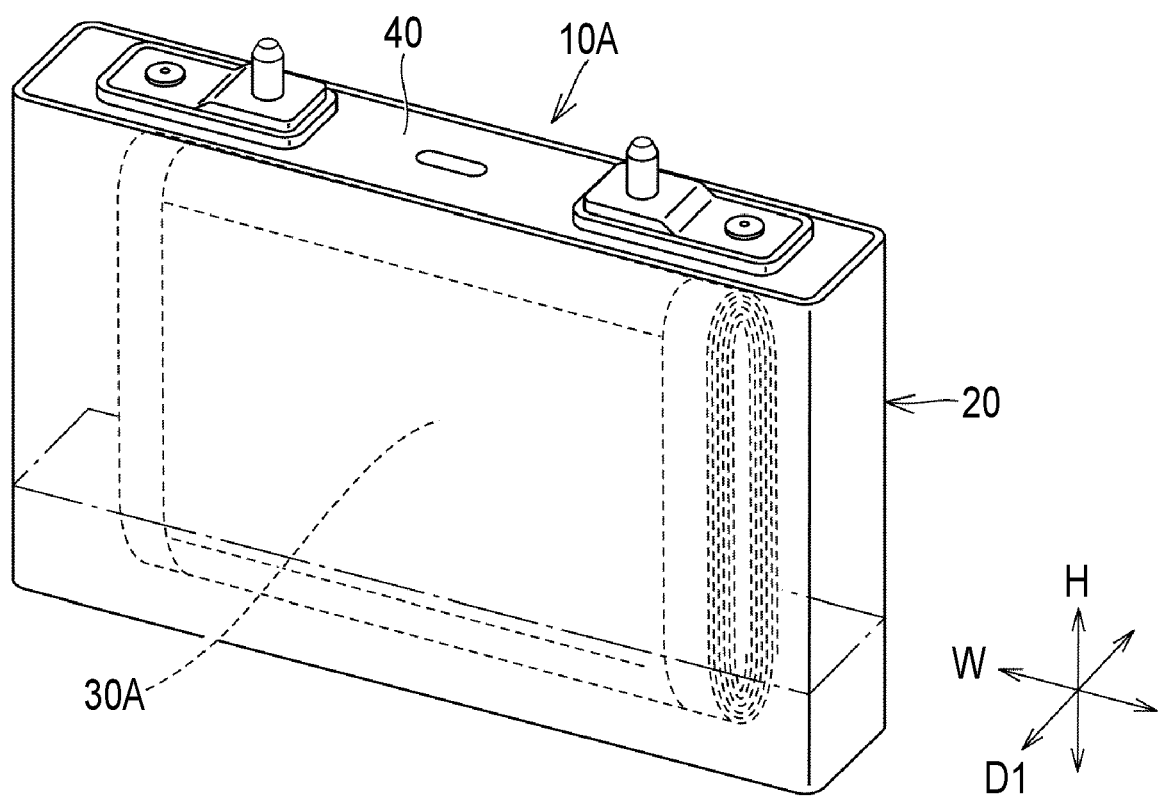
FIG. 14 is a perspective view showing a power storage cell included in a power storage device of Embodiment 2.
Figure 15:
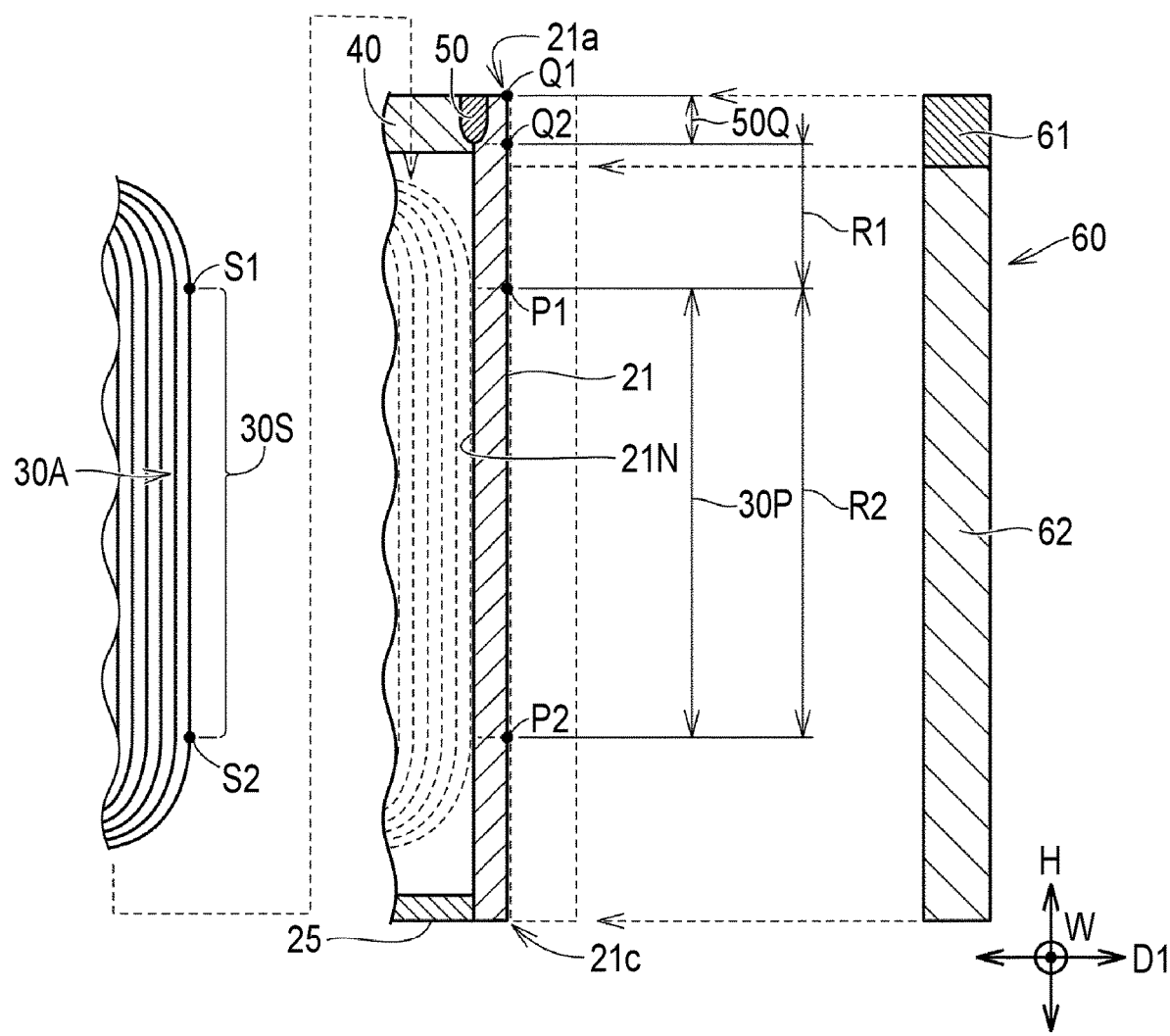
FIG. 15 is an exploded cross-sectional view of a power storage cell and a spacer included in the power storage device of Embodiment 2, and corresponds to FIG. 4 in Embodiment 1.

FIG. 14 is a perspective view showing a power storage cell 10A included in a power storage device of Embodiment 2. FIG. 15 is an exploded cross-sectional view of the power storage cell 10A and the spacer 60 included in the power storage device of Embodiment 2, and corresponds to FIG. 4 in Embodiment 1. The power storage cell 10A in Embodiment 2 is different from the power storage cell in Embodiment 1 in that an electrode body 30A is used instead of the electrode body 30.

The electrode body 30A is formed by, for example, winding a positive electrode sheet, a separator, and a negative electrode sheet in a laminated state and deforming the wound object to have a flat shape. The electrode body 30A also has a principal surface region 30S (FIG. 15) on an outer surface of the electrode body 30A itself. When the electrode body 30A is housed in the case 20, the principal surface region 30S of the electrode body 30A is adjacent to the inner surface 21N of the part of the case 20 that constitutes the end surface portion 21. The principal surface region 30S of the electrode body 30A is formed, for example, between end points S1, S2 of the winding shape curvature.

Also in Embodiment 2, in a state where a plurality of the power storage cells 10A and the spacer 60 are restrained by the restraining member 80 (FIG. 1), at least a part of the first region R1 on the end surface portion 21 of the case 20 receives the pressure of the first surface pressure from the spacer 60, and at least a part of the second region R2 on the end surface portion 21 of the case 20 receives the pressure of the second surface pressure from the spacer 60. The height of at least a part of the first region R1 receiving the pressure of the first surface pressure from the spacer 60 is 1 mm or more. The first surface pressure is higher than the second surface pressure and is in a range of 1.5 MPa or more and 3.5 MPa or less. With the configuration, the same action and effect as those in Embodiment 1 can be obtained.

Embodiment 3

Figure 16:
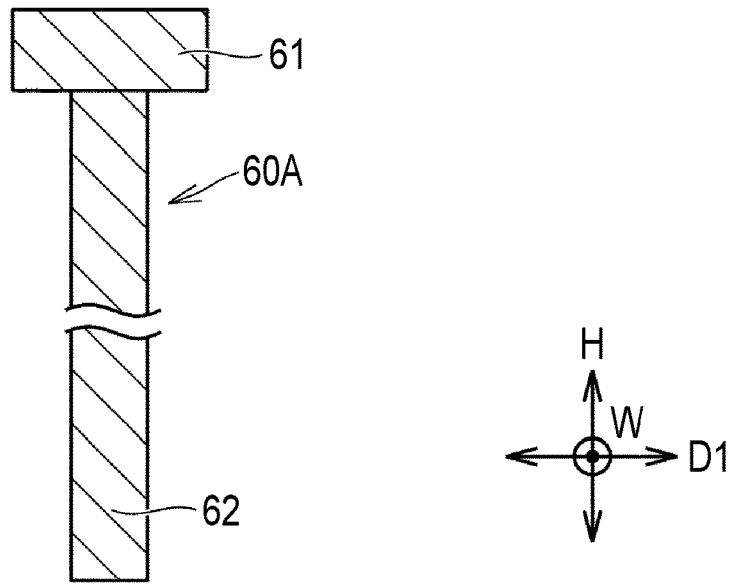
FIG. 16 is a cross-sectional view showing a spacer included in a power storage device of Embodiment 3, and shows a cross-sectional shape along a direction parallel to one direction D1.
Figure 17:
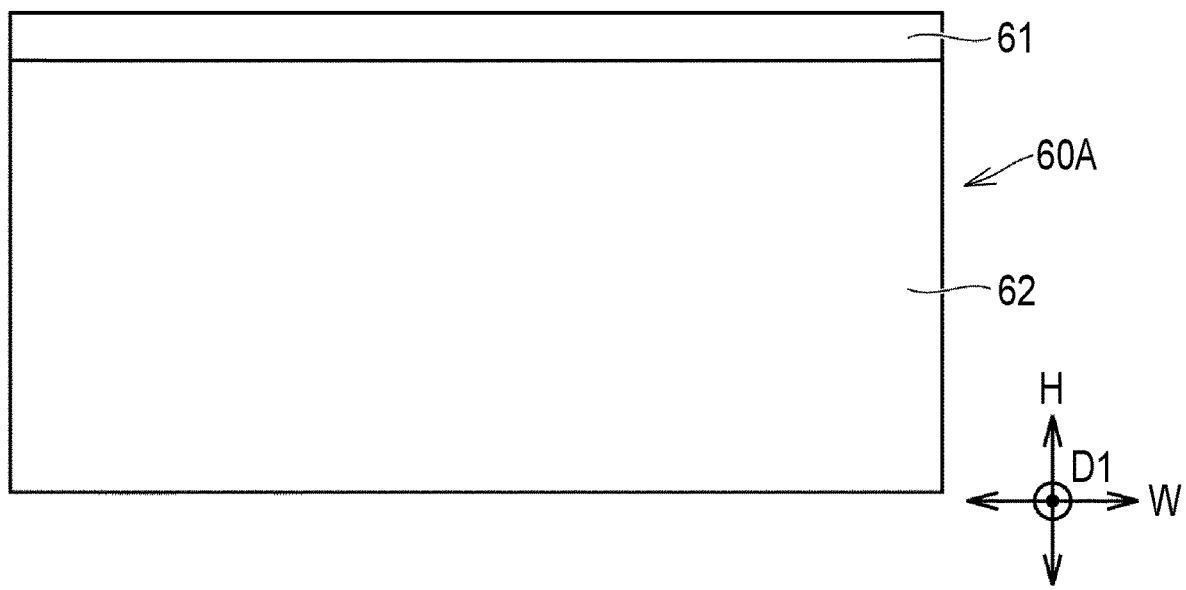
FIG. 17 is a diagram showing the spacer included in the power storage device of Embodiment 3, and shows an external structure of the spacer as viewed from a direction along the one direction D1.

FIG. 16 is a cross-sectional view showing a spacer 60A included in a power storage device of Embodiment 3, and shows a cross-sectional shape along a direction parallel to one direction D1. FIG. 17 is a diagram showing the spacer 60A included in the power storage device of Embodiment 3, and shows an external structure of the spacer 60A as viewed from a direction along the one direction D1.

As shown in FIGS. 16 and 17, in order to establish the above-mentioned relationship between the first surface pressure and the second surface pressure and to obtain the action and effect described in Embodiment 1, the spacer 60A has the first portion 61 that contacts the first region R1 and the second portion 62 that contacts the second region R2, and in the one direction D1, the first portion 61 may have a thickness thicker than a thickness of the second portion 62.

Embodiment 4

Figure 18:
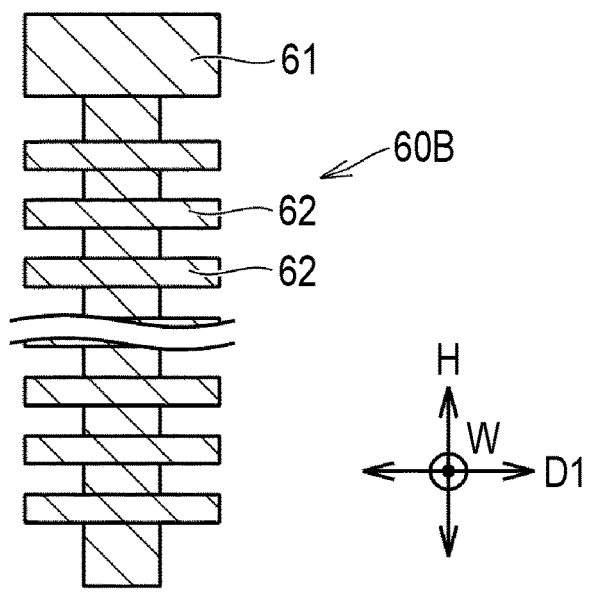
FIG. 18 is a cross-sectional view showing a spacer included in a power storage device of Embodiment 4, and shows a cross-sectional shape along a direction parallel to one direction D1.
Figure 19:
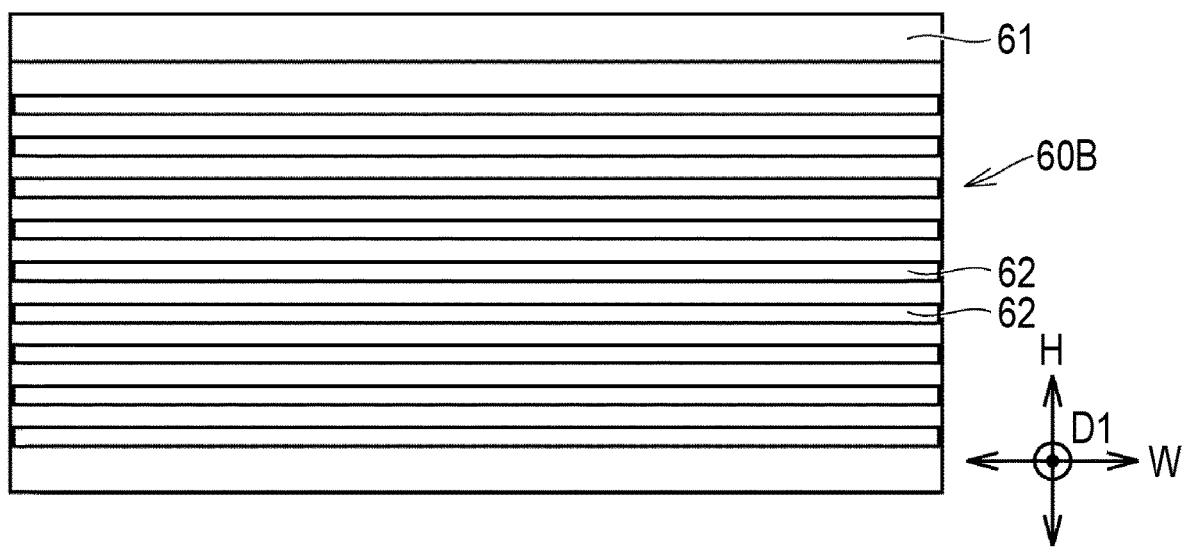
FIG. 19 is a diagram showing the spacer included in the power storage device of Embodiment 4, and shows an external structure of the spacer as viewed from a direction along the one direction D1.

FIG. 18 is a cross-sectional view showing a spacer 60B included in a power storage device of Embodiment 4, and shows a cross-sectional shape along a direction parallel to one direction D1. FIG. 19 is a diagram showing the spacer 60B included in the power storage device of Embodiment 4, and shows an external structure of the spacer 60B as viewed from a direction along the one direction D1.

As shown in FIGS. 18 and 19, in order to establish the above-mentioned relationship between the first surface pressure and the second surface pressure and to obtain the action and effect described in Embodiment 1, the spacer 60B has the first portion 61 that contacts the first region R1 and a plurality of the second portions 62 that contacts the second region R2, and the second portions 62 may be provided apart from each other at an interval.

Examples and Comparative Examples

Examples and comparative examples related to the present disclosure will be described with reference to FIGS. 20 and 21. As shown by sample numbers 1 to 8 and 11 to 62 in FIGS. 20 and 21, power storage devices having different magnitudes of the first surface pressure, different heights at which the first surface pressure acts, different magnitudes of the second surface pressure, and different aspect ratios of the end surface portion 21 were prepared, and a fatigue test and a cycle test were carried out. Hereinafter, the sample numbers 1 to 8, 11 to 62 will be referred to in combination with the word of examples and comparative examples.

In the fatigue test, the cell displacement amount was set to 2 mm, the number of times of displacement was set to 1500, and the presence or absence of occurrence of crack or breakage was confirmed. In FIGS. 20 and 21, a case where there was no crack was evaluated as A, a case where crack occurred was evaluated as B, and a case where breakage occurred was evaluated as C.

The cycle test was carried out under the charging condition of 4.25 V, 0.5 C CCCV charging, 0.1 C cut, and the discharging condition of 2.8 V, 0.5 C, in which the number of cycles was set to 500 cycles. In FIGS. 20 and 21, a case where a cell resistance increase rate was 110% or less was evaluated as A, a case where a cell resistance increase rate was 110% or more was evaluated as B, and a case where a cell resistance increase rate was 115% or more was evaluated as C.

In a case of Comparative Examples 1 to 4, the first surface pressure is higher than the second surface pressure and is in a range of 1.5 MPa or more and 3.5 MPa or less. The end surface portion 21 of the case 20 has an aspect ratio set to 1.4 or more, the aspect ratio being indicated by the length of the long side to the length of the short side. However, the height of at least a part of the first region R1 receiving the pressure of the first surface pressure from the spacer 60 is less than 1 mm. In Comparative Examples 1 to 4, the evaluation for fatigue breakage was B or C.

In a case of Examples 5 to 8, the first surface pressure is higher than the second surface pressure and is in a range of 1.5 MPa or more and 3.5 MPa or less. The end surface portion 21 of the case 20 has an aspect ratio set to 1.4 or more, the aspect ratio being indicated by the length of the long side to the length of the short side. The height of at least a part of the first region R1 receiving the pressure of the first surface pressure from the spacer 60 is 1 mm or more. In Examples 5 to 8, both the evaluation for fatigue breakage and the evaluation for cell resistance were A.

In a case of Comparative Examples 11 to 13, the first surface pressure is higher than the second surface pressure, but less than 1.5 MPa. In Comparative Examples 11 to 13, the evaluation for fatigue breakage was B or C.

In a case of Examples 14 to 21, the difference between the first surface pressure and the second surface pressure is 0.5 MPa or more. In Examples 14 to 21, both the evaluation for fatigue breakage and the evaluation for cell resistance were A. In a case of Examples 22 to 26, the difference between the first surface pressure and the second surface pressure is less than 0.5 MPa. In Examples 22 to 26, the evaluation for fatigue breakage was A, and the evaluation for cell resistance was B.

In a case of Comparative Examples 27, 28, 32, 33, 37, and 38, the first surface pressure is less than 1.5 MPa. In Comparative Examples 27, 28, 32, 33, 37, and 38, the evaluation for fatigue breakage was B or C.

In a case of Examples 29 to 31 and 34 to 36, the first surface pressure is 1.5 MPa or more, and the difference between the first surface pressure and the second surface pressure is 0.5 MPa or more. In Examples 29 to 31 and 34 to 36, both the evaluation for fatigue breakage and the evaluation for cell resistance were A.

In Examples 39 to 62, the evaluation for fatigue breakage was all A. When the difference between the first surface pressure and the second surface pressure is 0.5 MPa or more (Examples 39 to 45, 49 to 52, and 56 to 59), the evaluation for cell resistance was A.

Although the embodiments of the present disclosure have been described above, it should be considered that the embodiments disclosed herein are exemplary in all respects and are not restrictive. The scope of the present disclosure is defined by the terms of the claims, and is intended to include any modifications within the scope and meaning equivalent to the terms of the claims.

What is claimed is:
1. A power storage device comprising:
   a plurality of power storage cells arranged in one direction;
   a spacer disposed between two adjacent power storage cells among the power storage cells; and a restraining member configured to restrain the power storage cells and the spacer by applying a load along the one direction to the power storage cells and the spacer, wherein:

each of the power storage cells includes a case with a closed bottom, an electrode body housed in the case, and a lid body configured to close an upper opening of the case, the lid body being welded to an upper edge portion of the case;

a sealing part is formed between the case and the lid body by welding the case and the lid body to each other;

an outer surface of the case includes an end surface portion extending in a plane direction orthogonal to the one direction;

the end surface portion is formed in a rectangular shape having a long side extending in a width direction and a short side extending in a height direction, and has an aspect ratio of 1.4 or more, the aspect ratio being indicated by a length of the long side to a length of the short side;

the electrode body has a principal surface region adjacent to an inner surface of a part of the case that constitutes the end surface portion;

an upper end of the principal surface region extends to an upper end of the electrode body and a lower end of the principal surface region extends to a lower end of the electrode body;

the upper end of the principal surface region projected image extends to the upper end of the principal surface region and the lower end of the principal surface region projected image extends to the lower end of the principal surface region;

the end surface portion includes a first region between a lower end of a sealing part projected image and the upper end of the principal surface region projected image, and a second region between the upper end of the principal surface region projected image and a lower end of the principal surface region projected image, the sealing part projected image being defined as a project ion image projected onto the end surface portion when the sealing part is projected onto the end surface portion along the one direction, and the principal surface region projected image being defined as a projection image projected onto the end surface portion when the principal surface region is projected onto the end surface portion along the one direction;

in a state where the power storage cells and the spacer are restrained by the restraining member, the first region receives a pressure of a first surface pressure from the spacer, and at least a part of the second region receives a pressure of a second surface pressure from the spacer;

the first surface pressure is higher than the second surface pressure and is in a range of 1.5 MPa or more and 3.5 MPa or less;

a height of the first region receiving the pressure of the first surface pressure from the spacer is 1 mm or more;

a first portion of the spacer is disposed to contact the first region and not contact the second region;

a second portion of the spacer is disposed to contact the second region; and the first portion is harder than all portions of the second portion.

2. The power storage device according to claim 1, wherein:
a difference between the first surface pressure and the second surface pressure is 0.5 MPa or more; and
the second surface pressure is 0.01 MPa or more.

3. The power storage device according to claim 1, wherein the first region includes a region between an upper end of the sealing part projected image and the upper end of the principal surface region projected image.

4. The power storage device according to claim 1, wherein:
in the one direction, the first portion has a thickness thicker than a thickness of the second portion.

5. The power storage device according to claim 1, wherein:
the spacer has a plurality of second portions that contacts the second region; and
the second portions are provided apart from each other at an interval.

6. The power storage device according to claim 1, wherein:
the spacer has a height dimension larger than a height of the electrode body.

* * * * *